(12) United States Patent
Bartek et al.

(10) Patent No.: US 7,604,707 B2
(45) Date of Patent: *Oct. 20, 2009

(54) HIGHLY REFLECTIVE ASPHALT-BASED ROOFING MEMBRANE

(75) Inventors: Robert Bartek, Centennial, CO (US); Ruben G. Garcia, Littleton, CO (US)

(73) Assignee: Johns Manville, Denver, CO (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/432,449

(22) Filed: May 11, 2006

(65) Prior Publication Data

US 2006/0196596 A1    Sep. 7, 2006

Related U.S. Application Data

(62) Division of application No. 10/659,001, filed on Sep. 10, 2003, now Pat. No. 7,070,843.

(51) Int. Cl.
*B29C 65/52* (2006.01)
*B32B 37/12* (2006.01)
*B32B 37/24* (2006.01)

(52) U.S. Cl. .................. 156/278; 156/289; 156/307.3; 156/307.7; 427/430.1; 427/434.2

(58) Field of Classification Search .................. 156/71, 156/278, 289, 307.3, 307.7; 427/430.1, 434.2
See application file for complete search history.

(56) References Cited

U.S. PATENT DOCUMENTS

| | | | |
|---|---|---|---|
| 3,581,779 A | 6/1971 | Sylvia, Jr. | |
| 4,055,453 A * | 10/1977 | Tajima et al. | ................ 156/279 |
| 4,066,599 A | 1/1978 | Zimmerman | |
| 4,195,009 A | 3/1980 | Zimmermann | |
| 4,390,570 A | 6/1983 | Rehberg | |
| 4,442,148 A | 4/1984 | Stierli | |
| 4,745,032 A | 5/1988 | Morrison | |
| 4,749,731 A | 6/1988 | Kyminas et al. | |
| 4,755,409 A * | 7/1988 | Harkness | ................ 428/40.3 |
| 4,859,723 A | 8/1989 | Kyminas et al. | |
| 4,870,796 A | 10/1989 | Hart et al. | |
| 5,283,080 A | 2/1994 | Lamb et al. | |
| 5,434,009 A * | 7/1995 | Urbanek | ................ 428/489 |
| 5,824,401 A | 10/1998 | Jenkins et al. | |
| 5,884,446 A | 3/1999 | Hageman | |
| 5,964,946 A | 10/1999 | Zanchetta et al. | |
| 6,108,993 A | 8/2000 | Hageman | |
| 6,245,850 B1 | 6/2001 | Fields | |
| 6,487,830 B2 | 12/2002 | Robertson | |
| 6,502,360 B2 | 1/2003 | Carr, III | |
| 6,544,596 B2 | 4/2003 | Clemens | |

(Continued)

*Primary Examiner*—Philip C Tucker
*Assistant Examiner*—Sing P Chan
(74) *Attorney, Agent, or Firm*—Robert D. Touslee

(57) ABSTRACT

A prefabricated asphalt-based waterproof roofing membrane for use in a multi-ply asphalt-based commercial roofing system, e.g. a cap sheet that forms the exposed layer of a multiply built-up roofing system, is manufactured at a factory to have a highly reflective non-asphalt based elastomeric top coating layer with an upper surface that meets current EPA Energy Star requirements. Preferably, a polymer primer layer is interposed between the highly reflective coating layer and an asphalt saturated and coated reinforcing substrate to keep oils and other colored components in the asphalt from exuding into the highly reflective coating layer.

1 Claim, 2 Drawing Sheets

U.S. PATENT DOCUMENTS

| | | |
|---|---|---|
| 6,815,010 B2 | 11/2004 | Elfring et al. |
| 6,872,440 B1 * | 3/2005 | Kiik et al. .................. 428/141 |
| 6,924,015 B2 * | 8/2005 | Zanchetta et al. .......... 428/40.3 |
| 2002/0095907 A1 | 7/2002 | Robertson |
| 2002/0103283 A1 | 8/2002 | Elfring et al. |
| 2003/0068469 A1 | 4/2003 | Aschenbeck et al. |
| 2003/0152747 A1 | 8/2003 | Fensel et al. |
| 2003/0198736 A1 | 10/2003 | Fensel et al. |
| 2004/0009319 A1 | 1/2004 | Zanchetta et al. |
| 2004/0013854 A1 | 1/2004 | Zanchetta et al. |
| 2004/0071938 A1 | 4/2004 | Fensel et al. |
| 2004/0081789 A1 | 4/2004 | Kim |
| 2004/0241369 A1 * | 12/2004 | Pressutti et al. ............ 428/40.1 |
| 2004/0244316 A1 | 12/2004 | Macuga et al. |

* cited by examiner

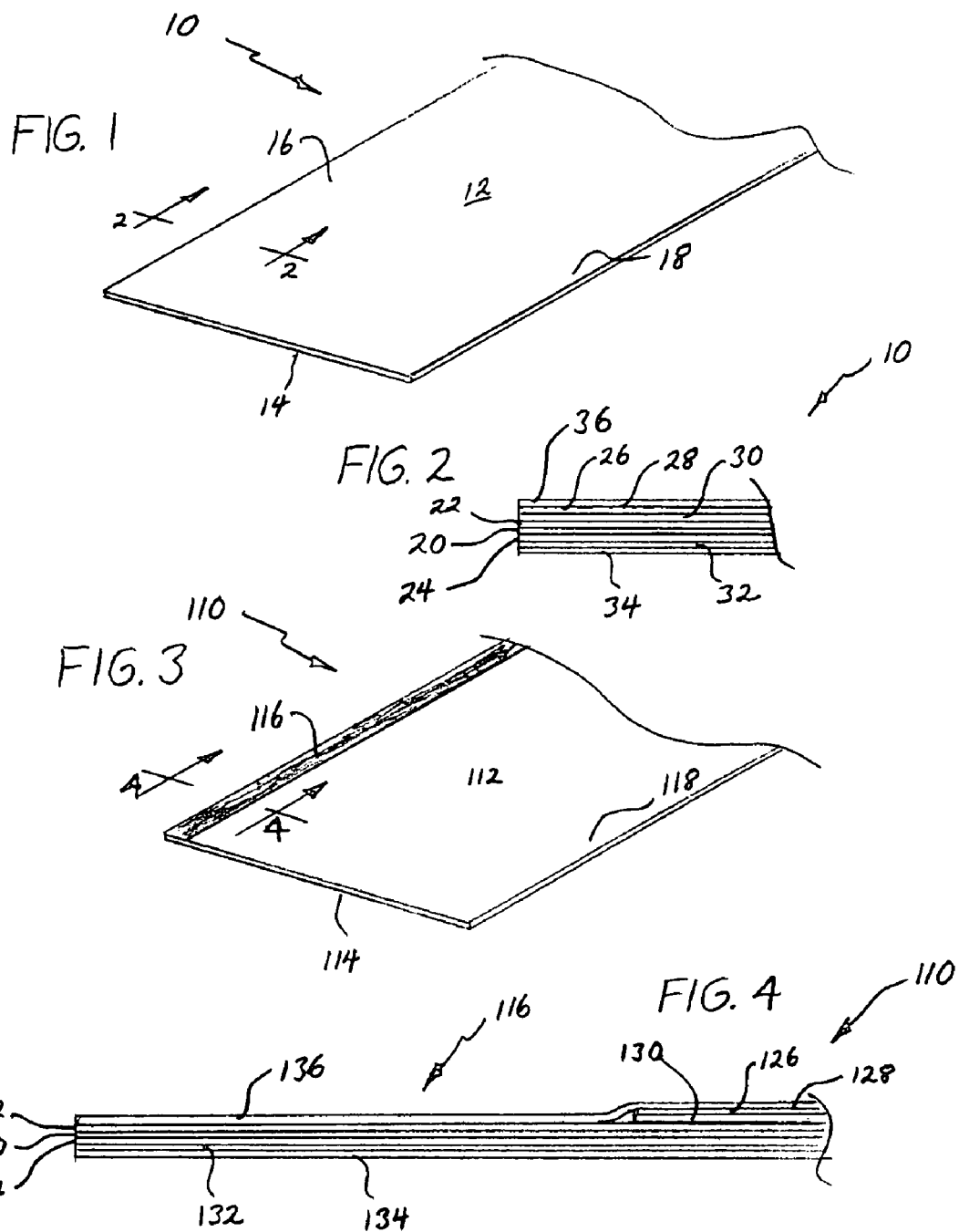

HIGHLY REFLECTIVE ASPHALT-BASED ROOFING MEMBRANE

This application is a divisional of U.S. application Ser. No. 10/659,001 filed on Sep. 10, 2003 now U.S. Pat. No. 7,070,843.

BACKGROUND OF THE INVENTION

The subject invention relates to asphalt-based waterproof roofing membranes used in multi-ply asphalt-based commercial roofing systems and, in particular, to a prefabricated asphalt-based waterproof roofing membrane for use in a multi-ply asphalt-based commercial roofing system, e.g. a cap sheet that forms the exposed layer of a multi-ply built-up roofing system, that is manufactured at a factory to have a highly reflective upper surface that meets EPA Energy Star requirements.

Asphalt-based waterproof roofing membranes, such as cap sheets, are currently manufactured in a process that includes several major process steps. The process steps for producing these black asphalt-based waterproof roofing membranes include: saturating a reinforcing substrate with asphalt (bitumen), typically an oxidized or modified asphalt (bitumen); building up layers of asphalt on both major surfaces of the reinforcing substrate until the asphalt saturated and coated reinforcing substrate formed attains a desired thickness; applying granules, release agents or release films, or a combination of granules and release agents or release films to at least one major surface of the asphalt-based waterproof roofing membrane; winding the finished asphalt-based waterproof roofing membrane into a roll; and packaging the roll of asphalt-based waterproof roofing membrane for storage and shipment to a job site. The process steps of saturating the reinforcing substrate with black asphalt, e.g. an oxidized or modified asphalt, and building up layers of asphalt on both major surfaces of the reinforcing substrate may occur simultaneously. Typically, the reinforcing substrate used in the asphalt-based waterproof roofing membrane is a non-woven fiberglass mat, a reinforced fiberglass mat, a non-woven polyester mat, a reinforced polyester mat, a veiled scrim of various fiber combinations, or a laminated composite of two or more of the preceding reinforcing substrates that provide the asphalt-based waterproof roofing membrane with the necessary strength and flexibility.

In a typical manufacturing process, the reinforcing substrate is passed through a saturator/coater where the reinforcing substrate is saturated and coated with asphalt at temperatures from 300 to 425° F. The asphalt typically contains asphalt and mineral fillers and may contain modifiers, such as thermoplastics [Amorphous Polypropylene (APP)], rubbers [Styrene-Butadiene-Styrene (SBS)], and other polymers, antioxidants, resins, oils, etc. Where the saturator and coater units are separate, the asphalts used in the saturator unit to saturate the reinforcing substrate and in the coater unit to coat the reinforcing substrate and build up the thickness of the asphalt saturated and coated reinforcing substrate may have the same composition or different compositions.

The reinforcing substrate is typically saturated and coated with asphalt by dipping the reinforcing substrate into a tank of the asphalt or by spreading asphalt over the top surface of the substrate as it passes through a coater. Squeeze rollers and other rollers in the saturator/coater apply the asphalt to the bottom surface of the sheet and distribute the asphalt evenly over the top and bottom surfaces of the reinforcing substrate to form built up layers of asphalt on the top and bottom surfaces of the reinforcing substrate.

After passing through the saturator/coater unit or the separate saturator and coater units, surfacing materials are typically adhered to both the top and bottom surfaces of the asphalt saturated and coated reinforcing substrate. In some processes, the asphalt saturated and coated reinforcing substrate may pass through a cooling unit where the asphalt saturated and coated reinforcing substrate is cooled prior to applying surfacing materials to the asphalt saturated and coated reinforcing substrate. Typically, the surfacing materials are applied to the asphalt saturated and coated reinforcing substrate by first passing the asphalt saturated and coated reinforcing substrate through a top surfacing unit. In the top surfacing unit, granules or other surfacing material(s) are applied to the top surface of the asphalt saturated and coated reinforcing substrate. With the desired surfacing material(s) applied to the top surface of the asphalt saturated and coated reinforcing substrate, the asphalt saturated and coated reinforcing substrate passes over a first press drum where the surfacing materials applied to the top surface of the asphalt saturated and coated reinforcing substrate are pressed into the asphalt layer on the top surface of the asphalt saturated and coated reinforcing substrate to assure good adhesion between the surfacing materials and the asphalt layer. As the asphalt saturated and coated reinforcing substrate passes over the first press drum, the asphalt saturated and coated reinforcing substrate is normally flipped simultaneously with the pressing operation so that the bottom surface of the asphalt saturated and coated reinforcing substrate is facing upward. This permits the application of surfacing materials (such as sand, other minerals (e.g. mica, talc, etc.), chemical release agents, and/or polymeric films) to the bottom surface of the asphalt saturated and coated reinforcing substrate by a bottom-surfacing unit. The asphalt saturated and coated reinforcing substrate then passes over a second press drum where the surfacing materials applied to the bottom surface of the asphalt saturated and coated reinforcing substrate are pressed into the asphalt layer on the bottom surface of the asphalt saturated and coated reinforcing substrate to assure good adhesion between the surfacing materials and the asphalt layer. The second turnover press drum returns the asphalt saturated and coated reinforcing substrate to its normal orientation.

After the application of the surfacing materials to the top and bottom surfaces of the asphalt saturated and coated reinforcing substrate, the surfaced asphalt saturated and coated reinforcing substrate is cooled rapidly by water-cooled rolls and/or water sprays. The surfaced asphalt saturated and coated reinforcing substrate is then passed through a drying section where the surfaced asphalt saturated and coated reinforcing substrate is typically air dried to finish the manufacture of the asphalt-based waterproof roofing membrane. The finished asphalt-based waterproof roofing membrane is then fed through a looper or accumulator section to permit the continuous movement of the finished asphalt-based waterproof roofing membrane during the cutting and winding operation where the finished asphalt-based waterproof roofing membrane is cut into selected lengths and wound into rolls for packaging, storage, and shipment to a job site.

The ever increasing consumption of energy to cool buildings, coupled with global and regional environmental warming issues, has caused a conversion in contemporary roofing technologies to roofing with more reflective top surfaces so that the roofing better reflects solar radiation to thereby reduce the amount of solar radiation absorbed by the roofing and the amount of energy required to cool buildings. Contemporary roofing technologies typically increase the reflectivity of the top surface of the roofing by making the top surface (the exposed surface) of the roofing system white.

Due to their irregular granular top surfaces and the intergranule spaces that reveal the black light-absorbing asphalt surfaces to which the granules are adhered, asphalt-based waterproof roofing membranes, such as cap sheets, currently on the market do not meet current EPA Energy Star reflective requirements as measured by ASTM standard E 903—Standard Test Method for Solar Absorptance, Reflectance, and Transmission of Materials Using Integrating Spheres. The current technology used at the job site to upgrade asphalt-based waterproof roofing membranes and provide these roofing membranes with more reflective top surfaces involves covering the exposed surfaces of the roofing membranes with a reflective white coating at the job site. This procedure leads to several problems: a waiting period of up to 30 days before the coating can be applied to the top surface of the membrane; the cost of and time required to clean the top surface of the membrane before applying the coating to the top surface of the membrane; the cost of and time involved in the labor intensive application of the coating to the top surface of the membrane; the quality and/or consistency of the application of the coating to the top surface of the membrane which is dependent on the skill and conscientiousness of the laborer; the limited service life of such coatings on the top surface of the membrane; and the requirement for the periodic maintenance and reapplication of the coating to the top surface of the membrane. The problems associated with applying white coatings at the job site to the top surfaces of asphalt-based waterproof roofing membranes, plus the ease with which single-ply roofing membranes, such as polyvinyl chloride and thermoplastic olefin single-ply roofing membranes, can be made from white compounds, have contributed to market shifts away from multi-ply asphalt-based commercial roofing systems to single-ply membrane roofing systems.

SUMMARY OF THE INVENTION

The method of prefabricating the asphalt-based waterproof roofing membrane and the prefabricated asphalt-based waterproof roofing membrane of the subject invention solve the problems associated with asphalt-based waterproof roofing membranes discussed in the background of the invention by providing an asphalt-based waterproof roofing membrane that is manufactured in a factory with a standardized reflective top surface that meets current EPA Energy Star reflective requirements as measured by ASTM standard E 903—Standard Test Method for Solar Absorptance, Reflectance, and Transmission of Materials Using Integrating Spheres. The standardized, prefabricated asphalt-based waterproof roofing membrane of the subject invention can be easily applied at a job site with no need to coat the asphalt-based roofing membrane at the job site to improve the reflectivity of the top surface of the membrane to meet EPA Energy Star requirements as measured by ASTM standard E 903. In the method of manufacturing the prefabricated asphalt-based waterproof roofing membrane of the subject invention, a highly reflective non-asphalt based elastomeric coating, in liquid or powder form, is applied to the top surface of a black asphalt saturated and coated reinforcing substrate of the membrane during the manufacture of the asphalt-based waterproof roofing membrane at the factory to provide the asphalt-based waterproof roofing membrane with a highly reflective top surface that meets current EPA Energy Star requirements as measured by ASTM standard E 903. Preferably, the highly reflective top surface of the asphalt-based waterproof roofing membrane is white. The highly reflective top surface of the asphalt-based waterproof roofing membrane may be smooth or may be embossed to enhance the appearance of the top surface and to provide a slip-resistant roofing surface on which the workers can walk.

The highly reflective elastomeric coating used in the prefabricated asphalt-based waterproof roofing membrane of the subject invention is opaque to protect the underlying asphalt layer of the asphalt saturated and coated reinforcing substrate of the membrane from the deleterious effects of ultraviolet radiation and may have various additives to improve the performance of the composite, e.g. fungi growth-inhibiting agents, fire retardants, etc.

The highly reflective coating of the subject invention is a polymer material binder that is preferably colored with a white pigment, such as titanium dioxide, zinc oxide, aluminum oxide. The polymer material binder used in the highly reflective coating to carry and bind the highly reflective pigments of the coating to the top surface of the asphalt layer of the asphalt saturated and coated reinforcing substrate of the membrane includes several families of binders. Preferably, the polymer binders are made up of amine-terminated polymer resins and/or amine-terminated chain extenders. Acrylic and isocyanate-based elastomers are particularly well suited for use as the coatings with the isocyanate elastomers being preferred. Preferably, a polymer primer, which is impermeable to the oils and other components of the asphalt, is applied between the highly reflective coating layer and the top surface of the top asphalt layer of the asphalt saturated and coated reinforcing substrate to prevent the exuding of oils and other components from the asphalt into the highly reflective coating and to thereby prevent the oils and other components of the asphalt from staining and otherwise discoloring or adversely affecting the highly reflective coating layer.

The highly reflective coating may be applied to the top surface of the asphalt saturated and coated reinforcing substrate, typically after the temperature of the asphalt saturated and coated reinforcing substrate has fallen to about 300° F. or less, by a number of techniques including: dip coating, spread coating, roll coating, spray coating and powder coating. The coatings are dried to maintain the cleanliness of the reflective surfaces of the asphalt-based waterproof roofing membranes thus formed and release films or agents are applied to the highly reflective top surfaces of the asphalt-based waterproof roofing membranes prior to winding the membranes into rolls.

BRIEF DESCRIPTION OF THE DRAWINGS

FIG. 1 is a schematic perspective view of a first embodiment of the asphalt-based waterproof roofing membrane of the subject invention.

FIG. 2 is a partial schematic cross section taken substantially along lines 2-2 of FIG. 1, on a larger scale than FIG. 1, to illustrate the layers of the asphalt-based waterproof roofing membrane of FIG. 1 plus the release sheets.

FIG. 3 is a schematic perspective view of a second embodiment of the asphalt-based waterproof roofing membrane of the subject invention.

FIG. 4 is a partial schematic cross section taken substantially along lines 4-4 of FIG. 3, on a larger scale than FIG. 3, to illustrate the layers of the asphalt-based waterproof roofing membrane of FIG. 3 plus the release sheets.

DESCRIPTION OF THE PREFERRED EMBODIMENTS

Figure 5:
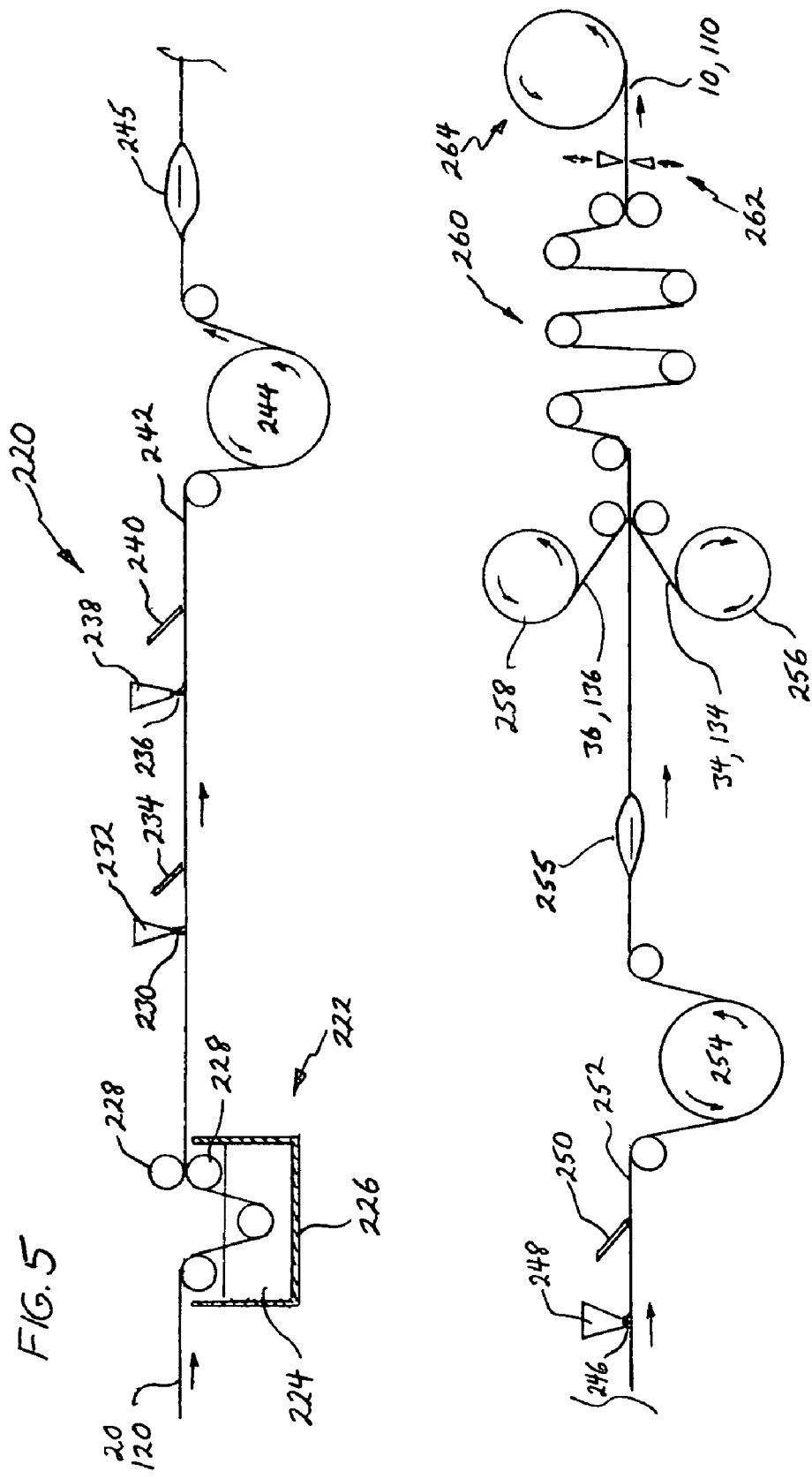
FIG. 5 is a schematic side view of a production line that may be used to practice the method of the subject invention

The prefabricated asphalt-based waterproof roofing membrane 10 of the subject invention, shown in FIGS. 1 and 2, has a top major surface 12 and a bottom major surface 14 that are each defined by the length and width of the membrane 10. The prefabricated asphalt-based waterproof roofing membrane 10 has a lateral edge portion 16, typically called the selvage edge portion of the roofing membrane, that extends for the length of the prefabricated asphalt-based waterproof roofing membrane. The lateral edge portion 16 of prefabricated asphalt-based waterproof roofing membrane 10 is typically about four inches in width and when the prefabricated asphalt-based waterproof roofing membrane 10 is installed on a roof, the top surface of this lateral edge portion 16 is overlapped and sealed to the underside of a lateral edge portion 18 of an adjacent prefabricated asphalt-based waterproof roofing membrane to form a watertight seam. The edge portion 18 has substantially the same width as the lateral edge portion 16 and also extends for the length of the prefabricated asphalt-based waterproof roofing membrane 10. Thus, when the prefabricated asphalt-based waterproof roofing membrane 10 is installed on a roof, the top surface of the lateral edge portion 16 is covered by the lateral edge portion 18 of the adjacent prefabricated asphalt-based waterproof roofing membrane while the remainder of the top major surface 12 of the prefabricated asphalt-based waterproof roofing membrane 10 is exposed to the weather. The prefabricated asphalt-based waterproof roofing membrane 10 is typically between 36 and 40 inches in width and comes in 1 square (108 square foot) rolls.

The prefabricated asphalt-based waterproof roofing membrane 10 includes: a reinforcing substrate 20; asphalt with which the reinforcing substrate 20 is saturated and which forms top and bottom layers 22 and 24 encapsulating the reinforcing substrate; and a top coating layer 26 with a highly reflective top surface 28 that is coextensive with or substantially coextensive with the top major surface 12 of the prefabricated asphalt-based waterproof roofing membrane 10. Preferably, the prefabricated asphalt-based waterproof roofing membrane 10 has a polymer primer layer 30, which is impermeable to the oils and other components of the asphalt. The impermeable polymer primer layer 30 is located between the highly reflective coating layer 26 and the top surface of the top asphalt layer 22 to prevent the exuding of oils and other components from the asphalt into the highly reflective coating layer 26 and to thereby prevent the oils and other components of the asphalt from staining and otherwise discoloring or adversely affecting the highly reflective top surface 28 of the coating layer 26. In addition, the prefabricated asphalt-based waterproof roofing membrane 10 normally includes a bottom surface layer 32 formed of conventional mineral surfacing materials, such as but not limited to such as mica, talc, sand, etc., chemical release agents, and/or polymeric film.

A release film or sheet 34 may overlie the bottom surface layer 32 of the membrane to keep the bottom major surface 14 of the prefabricated asphalt-based waterproof roofing membrane 10 from adhering to or discoloring the highly reflective coating layer 26 of top major surface 12 of the prefabricated asphalt-based waterproof roofing membrane 10 when the prefabricated asphalt-based waterproof roofing membrane is wound into a roll for packaging, storage, shipment and handling prior to installation. A release film or sheet 36 may overlie the top surface 28 of the highly reflective coating layer 26 and thus the top major surface 12 of the prefabricated asphalt-based waterproof roofing membrane 10 to maintain the cleanliness of the top surface 28 of the highly reflective coating layer 26. Where a release film or sheet 34 is not used on the bottom major surface of the prefabricated asphalt-based waterproof roofing membrane 10, the release film or sheet 36 also functions to keep the bottom major surface 14 of the prefabricated asphalt-based waterproof roofing membrane 10 from adhering to or discoloring the top major surface 12 of the prefabricated asphalt-based waterproof roofing membrane 10 when the prefabricated asphalt-based waterproof roofing membrane is wound into a roll for packaging, storage, shipment and handling prior to installation. The surfaces of the release sheets 34 and 36 in contact with the bottom and top major surfaces of the prefabricated asphalt-based waterproof roofing membrane 10 are treated with conventional release agents, e.g. silicone or some other conventional release agent, so that the sheets 34 and 36 may be easily peeled off of the major surfaces of the prefabricated asphalt-based waterproof roofing membrane 10 during installation.

The prefabricated asphalt-based waterproof roofing membrane 110 of the subject invention, shown in FIGS. 3 and 4, has a top major surface 112 and a bottom major surface 114 that are each defined by the length and width of the membrane 110. The prefabricated asphalt-based waterproof roofing membrane 110 has a lateral edge portion 116, typically called the selvage edge portion of the roofing membrane, which extends for the length of the prefabricated asphalt-based waterproof roofing membrane. The lateral edge portion 116 of prefabricated asphalt-based waterproof roofing membrane 110 is typically about four inches in width and when the prefabricated asphalt-based waterproof roofing membrane 110 is installed on a roof, the top surface of this lateral edge portion 116 is overlapped and sealed to the underside of a lateral edge portion 118 of an adjacent prefabricated asphalt-based waterproof roofing membrane to form a watertight seam. The edge portion 118 has substantially the same width as the lateral edge portion 116 and also extends for the length of the prefabricated asphalt-based waterproof roofing membrane 110. Thus, when the prefabricated asphalt-based waterproof roofing membrane 110 is installed on a roof, the top surface of the lateral edge portion 116 is covered by and sealed to the bottom surface of the lateral edge portion 118 of the adjacent prefabricated asphalt-based waterproof roofing membrane while the remainder of the top major surface 112 of the prefabricated asphalt-based waterproof roofing membrane 110 is exposed to the weather. The prefabricated asphalt-based waterproof roofing membrane 110 is typically between 36 and 40 inches in width and comes in 1 square (108 square foot) rolls.

The prefabricated asphalt-based waterproof roofing membrane 110 includes: a reinforcing substrate 120; asphalt with which the reinforcing substrate 120 is saturated and which forms top and bottom layers 122 and 124 encapsulating the reinforcing substrate; and a top coating layer 126 with a highly reflective top surface 128 that, except for the lateral edge portion 116 which remains uncoated by the top coating layer 126, is coextensive with or substantially coextensive with the remainder of top major surface 112 of the prefabricated asphalt-based waterproof roofing membrane 110. Preferably, the prefabricated asphalt-based waterproof roofing membrane 110 has a polymer primer layer 130, which is impermeable to the oils and other components of the asphalt. The impermeable polymer primer layer 130 is located between the highly reflective coating layer 126 and the top surface of the top asphalt layer 122 to prevent the exuding of oils and other components from the asphalt into the highly reflective coating layer 126 and to thereby prevent the oils and other components of the asphalt from staining and otherwise discoloring or adversely affecting the highly reflective top surface 128 of the coating layer 126. In addition, the prefabricated asphalt-based waterproof roofing membrane 110 includes a bottom surface layer 132 formed of conventional mineral surfacing materials, such as but not limited to such as mica, talc, sand, etc., chemical release agents, and/or polymeric film.

Preferably, the bottom surface layer 132, except for the lateral edge portion 118, which remains uncoated by the bottom surface layer 132, is coextensive with or substantially coextensive with the remainder of bottom major surface 114 of the prefabricated asphalt-based waterproof roofing membrane 110. This structure is especially well suited for prefabricated asphalt-based waterproof roofing membranes 110 that are to be used in cold-applied roof installations. With this structure, a SBS (Styrene-Butadiene-Styrene) rubber modified bitumen that is a pressure sensitive adhesive may be used to form the top and bottom asphalt layers 122 and 124 to thereby enable the overlapping lateral edge portions 116 and 118 of adjacent prefabricated asphalt-based waterproof membranes 110 to be bonded together with a watertight weather secure seal. Preferably, a release film or sheet 134 overlies the bottom surface layer 132 and lateral edge portion 118 of the bottom major surface of the membrane to keep the bottom major surface 114 of the prefabricated asphalt-based waterproof roofing membrane 110 from adhering to or discoloring the highly reflective coating layer 126 of top major surface 112 of the prefabricated asphalt-based waterproof roofing membrane 110 when the prefabricated asphalt-based waterproof roofing membrane is wound into a roll for packaging, storage, shipment and handling prior to installation. Preferably, a release film or sheet 136 overlies the top surface 128 of the highly reflective coating layer 126 and the lateral edge portion 116 of the top major surface 112 of the prefabricated asphalt-based waterproof roofing membrane 110 to maintain the cleanliness of the top surface 128 of the highly reflective coating layer 126 and keep the lateral edge portion 116 from adhering to the bottom major surface 114 of the membrane when the prefabricated asphalt-based waterproof roofing membrane is wound into a roll for packaging, storage, shipment and handling prior to installation. Where a release film or sheet 134 is not used on the bottom major surface of the prefabricated asphalt-based waterproof roofing membrane 110, the release film or sheet 136 functions to keep the bottom major surface 114 of the prefabricated asphalt-based waterproof roofing membrane 110 from adhering to or discoloring the top major surface 112 of the prefabricated asphalt-based waterproof roofing membrane 110 when the prefabricated asphalt-based waterproof roofing membrane is wound into a roll for packaging, storage, shipment and handling prior to installation. The surfaces of the release sheets 134 and 136 in contact with the bottom and top major surfaces of the prefabricated asphalt-based waterproof roofing membrane 110 are treated with conventional release agents, e.g. silicone or some other conventional release agent, so that the sheets 134 and 136 may be easily peeled off of the major surfaces of the prefabricated asphalt-based waterproof roofing membrane 110 for installation on a roof.

While the prefabricated asphalt-based waterproof roofing membranes 10 and 110 may include a layer of top surfacing materials, such as granules, mica, talc, etc. intermediate the top surfaces of the top asphalt layers 22 and 122 and the highly reflective coating layers 26 and 126 or on the highly reflective coating layers 26 and 126, the preferred embodiments of the prefabricated asphalt-based waterproof roofing membranes 10 and 110 do not include any such layer of traditional top surfacing materials. The presence of such a layer of traditional top surfacing materials could adversely affect the adhesion between the highly reflective coating layers 26 and 126 and the top asphalt layers 22 and 122 and/or could reduce the reflectivity of the top surfaces 28 and 128 of the highly reflective coatings 26 and 126.

The reinforcing substrates 20 and 120 of the prefabricated asphalt-based waterproof roofing membranes 10 and 110 may be any of the conventional reinforcing substrates commonly used in asphalt-based waterproof roofing membranes to provide the membranes with the necessary strength and flexibility, such as, but not limited to: a non-woven fiberglass mat, a reinforced fiberglass mat, a non-woven polyester mat, a reinforced polyester mat, a veiled scrim of various fiber combinations, or a laminated composite of two or more of the preceding reinforcing substrates.

The compositions of the asphalt saturating the reinforcing substrates 20 and 120 and forming the top and bottom layers 22, 24 and 122, 124 on the reinforcing substrates 20 and 120 may be any of the asphalt compositions discussed above and/or commonly used in asphalt-based waterproof roofing membranes. These asphalt compositions may include fire retardant chemicals, and typically, range from mineral filled oxidized asphalts to polymer-modified asphalts that are modified with modifiers, such as thermoplastics [Amorphous Polypropylene (APP)], rubbers [Styrene-Butadiene-Styrene (SBS)], and other polymers, antioxidants, resins, oils, etc. The polymer-modified asphalts may also include mineral fillers.

The highly reflective coating layers 26 and 126 are composed of a polymer binder material or materials and a reflective pigment or pigments, preferably a white pigment, such as but not limited to titanium dioxide, zinc oxide, aluminum oxide, other mineral pigments, or a combination of these pigments in quantities sufficient to make the coating layers 26 and 126 both opaque to solar radiation and highly reflective. The pigments in the highly reflective coating layers 26 and 126 protect: the impermeable polymer primer layers 30 and 130 (when used); the polymer binder materials of the coating layers 26 and 126; and the underlying asphalt layers 22 and 122 of the asphalt saturated and coated reinforcing substrate 20 and 120 from the deleterious effects of ultraviolet radiation. The highly reflective coating layer 26 and 126 may also include additional additives that: aid in limiting the growth of fungi during service; improve fire resistance; enhance heat, light and impact stability; improve the application and flow characteristics of the coating (slip agents, surfactants, thickeners, viscosity depressants, etc.); and reduce the aging rate, discoloration, and dirt adherence of the coating during service. While the highest reflectance values require the highly reflective coating layers 26 and 126 to have smooth top surfaces 28 and 128, it may be feasible to emboss the top surfaces 28 and 128 of the highly reflective coating layers 26 and 126 to enhance the appearance of the top major surfaces 12 and 112 of the prefabricated asphalt-based waterproof roofing membranes 10 and 110 and make the top major surfaces 12 and 112 of the prefabricated asphalt-based waterproof roofing membranes 10 and 110 more slip resistant.

There are several families of polymer binders that are well suited for use as the polymer binder materials in the highly reflective coating layers 26 and 126 to carry the highly reflective pigments of the highly reflective coating layers 26 and 126 and bind the highly reflective pigments of the highly reflective coating layers 26 and 126 to the top asphalt layers 22 and 122 or the impermeable polymer primer layers 30 and 130 (when used). Acrylic and isocyanate-based elastomers are particularly well suited for use as the polymer binder materials in the highly reflective coating layers 26 and 126. Due to their fast curing times; their durability when subjected to weathering forces, chemical contaminants, and solar radiation while in service on rooftops; their low glass transition temperatures (the property of remaining flexible at low temperatures); their low or nonexistent volatile organic compound emissions (voc emissions) during application; and their ability to be reapplied at the job site should the highly reflective top surfaces 28 and 128 of the membrane be damaged; isocyanate elastomers are currently preferred.

The currently preferred isocyanate elastomers are formed by reacting polyisocyantes with polyester or polyester resins (urethanes) or with polyamines (polyurea). Due to their extremely fast reaction kinetics and cure and their durability, polyurea elastomers are most preferred. Polyurea elastomers may be derived from condensing an isocyanate component and a resin blend component. The isocyanate component may be aromatic or aliphatic in nature and may be a monomer, polymer, or any variant reaction of isocyanates, quasi-prepolymer, or a prepolymer. The prepolymer, quasi-prepolymer may be made of an amine-terminated polymer resin, or a hydroxyl-terminated polymer resin. However, the aliphatic variant is most preferred because the aliphatic variant exhibits the best resistance to yellowing (it does not yellow) with exposure to ultraviolet radiation. Preferably, the resin blend is made up of amine-terminated polymer resins and/or amine-terminated chain extenders. The amine-terminated polymer resins in the preferred blend will not have any intentional hydroxyl moieties. Any hydroxyls are a result of an incomplete conversion to the amine-terminated polymer resins. The preferred resin blend may also contain additives or non-primary components. These additives may contain hydroxyls, such as pre-dispersed pigments in a polyol carrier. Normally, the resin blend will not contain a catalyst. Polyurea coatings may also be comprised of aspartic esters, which provide amine functionality.

In the application of the highly reflective coating layers 26 and 126 to the top asphalt layers 22 and 122 of the membranes 10 and 110, incompatibility between the acrylic or isocyanate elastomers of the coating layers 26 and 126 and the asphalt (e.g. oxidized or polymer modified asphalt) of the asphalt layers 22 and 122 is a primary concern. This interaction can result in the exudation of oils and other colored components out of the asphalt into the pores or structure of the highly reflective coating layers 26 and 126. The exudation of such oils and other colored components into the highly reflective coating layers 26 and 126 can cause permanent staining and discoloration of the highly reflective top surfaces 28 and 128 of the coating layers 26 and 126. In addition, the exudation of such oils into the elastomers of the coating layers 26 and 126 may also exacerbate the aging rate of or otherwise adversely affect the coating layers. To prevent any significant exudation of oils and other colored components from the asphalt layers 22 and 122 into the coating layers 26 and 126, the polymer primer layers 30 and 130 that are impermeable or substantially impermeable to the oils and other colored components of the asphalt in the asphalt layers 22 and 122 may be located intermediate the top surface of the asphalt layers 22 and 122 and the bottom surfaces of the highly reflective coating layers 26 and 126. Suitable polymer primers for the layers 30 and 130 include those containing polyvinyl acetate, polyvinylidene chloride, cured polyacrylonitrile, cellulose polymers, and others such as disclosed in U.S. Pat. No. 4,442,148, issued Apr. 10, 1984. The disclosure of U.S. Pat. No. 4,442, 148, is hereby incorporated herein in its entirety by reference.

Other polymer primers than those set forth above that will block or substantially block the exudation of oils and other colored components from the asphalt may also be used.

The reflectance of the top major surfaces 12 and 112 of the prefabricated asphalt-based waterproof roofing membranes 10 and 110 formed by the top highly reflective surfaces 28 and 128 of the top coating layers 26 and 126, as measured by ASTM standard E 903—Standard Test Method for Solar Absorptance, Reflectance, and Transmission of Materials Using Integrating Spheres, will meet current EPA Energy Star reflective requirements for low-slope roof products. The current EPA Energy Star reflectance requirements are an Initial Solar Reflectance greater than or equal to 0.65 and a Maintenance of Solar Reflectance greater or equal to 0.50 three years after installation under normal conditions. The current test criteria for determining the Initial Solar Reflectance requires the testing of a 3 inch by 3 inch sample of the product in accordance with ASTM E 903 (values for solar absorptance and transmission need not be obtained) using a black background. The current test criteria for determining the Maintenance of Solar Reflectance three years after installation under normal conditions may use any of three test methods set forth in the current EPA Energy Star guidelines including the following test method. A minimum of three (3) samples from three existing roofs on which the product has been installed for a minimum of three years with one of the existing roofs being located within a major metropolitan area such as Atlanta, Boston, Chicago, Dallas, Houston, Los Angles, Miami, Minneapolis, New York, Philadelphia, San Francisco, St. Louis, Washington D.C., etc. At least three (3) measurements of solar reflectance are to be taken from different areas on each sample in accordance with ASTM E 903. The average of all solar reflectance values obtained from the samples will be used to determine the solar reflectance of the weathered roof product. ASTM standard E 903 test method measures solar reflectance by using spectrophotometers that are equipped with integrating spheres. The test method is set forth in the ASTM test Designation E 903-96, approved Apr. 10, 1996 and published May 1996. ASTM test Designation E 903-96 is hereby incorporated herein by reference in its entirety.

FIG. 5 schematically illustrates a typical manufacturing line 220 that could be used for making the prefabricated asphalt-based waterproof roofing membranes 10 and 110. As shown in FIG. 5, in the manufacturing process of the subject invention, the reinforcing substrate 20 or 120 may be passed through a standard saturator/coater unit 222 or a standard saturator unit and a standard coater unit (not shown) where the reinforcing substrate 20 or 120 is saturated and coated with asphalt 224 at temperatures typically between 300 to 425° F. The saturator/coater unit 222 of FIG. 5 includes a tank 226 that contains the asphalt 224 and squeeze rollers 228. The asphalt 224 may be any of the asphalt compositions discussed above and/or commonly used in the industry to make asphalt-based waterproof roofing membranes and typically contains asphalt and mineral fillers and may contain modifiers, such as thermoplastics [Amorphous Polypropylene (APP)], rubbers [Styrene-Butadiene-Styrene (SBS)], and other polymers, antioxidants, resins, oils, etc. Where the saturator and coater units are separate, the asphalts used in the saturator unit to saturate the reinforcing substrate 20 or 120 and in the coater unit to coat the reinforcing substrate 20 or 120 and build up the thickness of the saturated and coated reinforcing substrate 20 or 120 may have the same composition or different compositions.

As shown in FIG. 5, the reinforcing substrate 20 or 120 is saturated and coated with the asphalt 224 by passing the reinforcing substrate 20 or 120 through a pool of asphalt 224 in the tank 226. The thicknesses of the top and bottom asphalt layers 22, 24 or 122, 124 of the asphalt saturated and coated reinforcing substrate 20 or 120 and the overall thickness of the asphalt saturated and coated reinforcing substrate 20 or 120 are then set by passing the saturated and coated reinforcing substrate between the spaced apart squeeze rollers 228. The spaced apart squeeze rollers 228 distribute the asphalt 224 evenly throughout the reinforcing substrate and over the top and bottom surfaces of the reinforcing substrate to form the built up layers of asphalt 22, 24 or 122, 124 on the top and bottom surfaces of the reinforcing substrate 20 or 120.

In the preferred method of the subject invention, a polymer primer layer 30 or 130 that is impermeable or substantially impermeable to the oils and other colored components of the asphalt 224 is then applied to the top surface of the top asphalt layer 22 or 122. The polymer primer material 230 that forms the polymer primer layer 30 or 130 would typically be applied to the top surface of the top asphalt layer 22 or 122 after the top asphalt layer 22 or 122 has been cooled to a temperature below 300° F. To form the polymer primer layer 30 of the roofing membrane 10, the polymer primer material 230 would be applied (e.g. poured or sprayed) across the entire width of the top surface of the top asphalt layer 22 by an applicator 232. To form the polymer primer layer 130 of the roofing membrane 110, the polymer primer material 230 would not be applied to the lateral edge portion 116, but would be applied (e.g. poured or sprayed) across the remaining width of the top surface of the top asphalt layer 122 by an applicator 232 with a barrier preventing the primer material from flowing onto the lateral edge portion 116. The pool of polymer primer material 230 thus formed then passes beneath a doctor blade 234 that smoothes the top surface of the polymer primer material and forms the pool of polymer primer material into the polymer primer layer 30 or 130. The polymer primer layer 30, 130 is then typically air dried or cured prior to applying the pigment filled polymer binder material 236 that is formed into the highly reflective coating layer 26, 126. While the technique shown for applying the polymer primer material 230 to the top surface of the top asphalt layer 22 or 122 is a spread coating technique, it is contemplated that the polymer primer material 230 could be applied to the top surface of the top asphalt layer 22 or 122 by other techniques commonly used in the industry, such as but not limited to, dip coating, roll coating, spray coating, and powder coating techniques.

Where the polymer primer material 230 is utilized to provide the membrane 10, 110 with the polymer primer layer 30 or 130, after the polymer primer layer 30 or 130 is dried, the pigment filled polymer binder material 236 that is formed into the highly reflective coating layer 26 or 126 may be poured or sprayed in liquid form onto the top surface the polymer primer layer 30 or 130 by an applicator 238. Where the polymer primer material 230 is not utilized to form the polymer primer layer 30 between the asphalt layer 22 and the highly reflective coating layer 26 of the roofing membrane 10, the pigment filled polymer binder material 236 that is formed into the highly reflective coating layer 26 could be poured or sprayed in liquid form across the entire width of and directly onto the top surface of the top asphalt layer 22 by the applicator 238. Where the polymer primer material 230 is not utilized to form the polymer primer layer 130 between the asphalt layer 122 and the highly reflective coating layer 126 of the roofing membrane 110, the pigment filled polymer binder material 236 that is formed into the highly reflective coating layer 126 would not be poured or sprayed onto the lateral edge portion 116, but would be poured or sprayed in liquid form across the remaining width of and directly onto the top surface of the top asphalt layer 122 by the applicator 238 with a barrier preventing the pigment filled polymer binder material from flowing onto the lateral edge portion 116. The pool of pigment filled polymer binder material 236 thus formed then passes beneath a doctor blade 240 that smoothes the top surface of the pigment filled polymer binder material 236 and forms the pool of pigment filled polymer binder material 236 into the highly reflective coating layer 26 or 126. The highly reflective coating layer 26 or 126 is formed by the doctor blade 240 to a desired thickness and smoothness that is sufficient to provide the highly reflective coating layer 26 or 126 and the prefabricated asphalt-based waterproof roofing membrane 10 or 110 with the necessary reflectance.

While the technique shown for applying the pigment filled polymer binder material 236 to the top surface of the polymer primer layer 30 or 130 or the top surface of the top asphalt layer 22 or 122 is a spread coating technique, it is contemplated that the pigment filled polymer binder material 236 could be applied to the top surface of the polymer primer layer 30, 130 or the top surface of the top asphalt layer 22, 122 by other techniques commonly used in the industry, such as but not limited to, dip coating, roll coating, spray coating, and powder coating techniques. Where the pigment filled polymer binder material 236 is in powder form, preferably, the pigment filled polymer binder material 236 is heated by a heater (not shown) to melt the powder or the surface temperature of the polymer primer layer 30, 130 or the top asphalt layer 22, 122 is hot enough to melt the pigment filled polymer binder material 236 to form a pool of the pigment filled polymer binder material 236.

With the highly reflective coating layer 26 or 126 applied to the top surface of the asphalt layer 22 or 122 or the top surface of the polymer primer layer 30 or 130, the laminate 242 thus formed by the asphalt saturated and coated reinforcing substrate 20 or 120 with the highly reflective coating layer 26 or 126 or the polymer primer layer 30 or 130 and the highly reflective coating layer 26 or 126 may be passed around a first press drum 244. As the laminate 242 passes around the first turnover press drum 244, the layers 22, 26 or 22, 30, 26 of the roofing membrane 10 or the layers 122, 126 or 122, 130, 126 of the roofing membrane 110 are pressed together to assure good adhesion between the layers. As or after the laminate 242 passes over the first press drum 244, the laminate is flipped (represented schematically by 245 in FIG. 5) so that the bottom surface of the bottom asphalt layer 24 or 124 of the laminate is facing upward. This permits the application of surfacing materials (such as sand, other minerals (e.g. mica, talc, etc.), chemical release agents, and/or polymeric films) to the bottom surface of the laminate 242.

In FIG. 5, bottom surfacing material(s) 246 that form the bottom surface layer 32 or 132 of the roofing membrane 10 or 110 are shown being poured or sprayed onto the bottom surface of the bottom asphalt layer 24 or 124 by an applicator 248. To form the bottom surface layer 32 of the roofing membrane 10, the surfacing materials 246 would be poured, sprayed or otherwise applied across the entire width of the bottom surface of the bottom asphalt layer 24 by an applicator 248. To form the bottom surface layer 132 of the roofing membrane 110, the surfacing materials 246 would not be poured, sprayed or applied onto the lateral edge portion 118, but would be poured, sprayed or otherwise applied across the remaining width of the bottom surface of the bottom asphalt layer 124 by an applicator 248 with a barrier preventing the surfacing materials from flowing onto the lateral edge portion 118. The layer of surfacing material(s) thus formed then passes beneath a doctor blade 250 that smoothes the normally bottom surface of the surfacing material(s) and forms the layer of surfacing material(s) into a bottom surface layer 32 or 132 having a desired thickness and smoothness.

The laminate 252 thus formed is then passed around a second press drum 254 where the surfacing materials 246 applied to the normally bottom surface of the asphalt layer 24 or 124 of the laminate 252 are pressed into the bottom surface of the asphalt layer 24 or 124 to assure good adhesion between the surfacing material(s) 246 and the asphalt layer 24 or 124. After the laminate 252 passes over the second turnover press drum 254, the laminate 252 is then flipped (represented schematically by 255 in FIG. 5) and returned to its normal orientation.

After the application of the top layers 22, 26 and the bottom layers 24, 32 or the top layers 22, 30, 26 and bottom layers 24, 32 to the top and bottom surfaces of the asphalt saturated and coated reinforcing substrate 20 or the application of the top layers 122, 126 and the bottom layers 124, 132 or the top layers 122, 130, 126 and bottom layers 124, 132 to the top and bottom surfaces of the asphalt saturated and coated reinforcing substrate 120, the laminate 252 formed is rapidly cooled by water-cooled rolls and/or water sprays. The laminate 252 is then passed through a drying section where the composite is air dried/cured to solidify the highly reflective top coating layer 26 or 126 and the bottom layer 32 or 132 and complete the manufacture of the prefabricated asphalt-based waterproof roofing membrane 10 or 110. A bottom release sheet 34 or 134 is applied to the bottom surface layer 32 or 132 and a top release sheet 36 or 136 is applied to the top surface of the highly reflective coating layer 26 or 126 of the prefabricated asphalt-based waterproof roofing membrane 10 or 110 from rolls 256 and 258.

The prefabricated asphalt-based waterproof roofing membrane 10 or 110 is then fed through a looper or accumulator section 260 to permit the continuous movement of the prefabricated asphalt-based waterproof roofing membrane 10 or 110 during the cutting and winding operation. In the cutting and winding operation, the prefabricated asphalt-based waterproof roofing membrane 10 or 110 is periodically cut to a desired length or lengths by a cutting unit 262 and wound into rolls 264 for packaging, storage, and shipment to a job site.

Preferably, additional surfacing materials are not applied to the top surface of the highly reflective coating layer 26 or 126. However, after the highly reflective top layer 26 or 126 is applied to the top asphalt layer 22 or 122 or the polymer primer layer 30 or 130 and prior to passing the asphalt saturated and coated reinforcing substrate 20 or 120 over the first press drum 244, surfacing materials (such as roofing granules, sand, other minerals (e.g. mica, talc, etc.), chemical release agents, and/or release films) may be applied to the top surface 28 or 128 of the highly reflective coating layer 26 or 126. While it is preferred to prefabricate the prefabricated asphalt-based waterproof roofing membrane 10 or 110 in line, as described above, it is contemplated that the application of the highly reflective coating layer 26 or 126 could be effected on a separate process line. However, this would appear to be relatively impractical in that it would add to the number of process steps and the costs of manufacture.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a prefabricated asphalt-based waterproof roofing membrane; the prefabricated asphalt-based waterproof roofing membrane having a length and a width; the prefabricated asphalt-based waterproof roofing membrane having a top major surface and a bottom major surface defined by the length and the width of the prefabricated asphalt-based waterproof roofing membrane; the tap major surface of the prefabricated asphalt-based waterproof mating membrane having an exposed portion that is exposed to the weather when the prefabricated asphalt-based waterproof roofing membrane is installed on a roof and a lateral edge portion, extending for the length of the prefabricated asphalt-based waterproof roofing membrane, that is overlapped by an adjacent prefabricated asphalt-based waterproof roofing membrane when the prefabricated asphalt-based waterproof roofing membrane is installed on a roof, the method consisting of:

providing a reinforcing substrate having a length and a width; the reinforcing substrate having a top major surface and a bottom major surface defined by the length and the width of the reinforcing substrate;

simultaneously saturating and coating the reinforcing substrate with asphalt by passing the reinforcing substrate through a pool of asphalt and squeeze milers to evenly distribute the asphalt throughout the reinforcing substrate and form a top asphalt layer overlaying and coextensive with the top major surface of the reinforcing substrate and a bottom asphalt layer overlaying and coextensive with the bottom major surface of the reinforcing substrate so that the top and bottom asphalt layers, with the asphalt saturated reinforcing substrate, form an asphalt saturated and coated reinforcing substrate;

applying a highly reflective non-asphalt based elastomeric coating material, in liquid or powder form, only to a first portion of a top major surface of the top asphalt layer of the saturated and coated reinforcing substrate while leaving a second portion of the top surface of the top asphalt layer uncoated and exposed; the coating material containing an isocyanate-based elastomeric binder material to bind highly reflective pigments of the coating material to the first portion of the top major surface of the top asphalt layer; forming a highly reflective non-asphalt based elastomeric coating layer from the coating material only on and bonded to the first portion of the top major surface of the top asphalt layer of the saturated and coated reinforcing substrate so that the second portion of the top major surface of the top asphalt layer forms an uncoated and the exposed lateral edge portion of the prefabricated asphalt-based waterproof roofing membrane that extends for the length of the prefabricated asphalt-based waterproof roofing membrane to be overlapped by and sealed to an underside of an adjacent prefabricated asphalt-based waterproof roofing membrane when the prefabricated asphalt-based waterproof rooting membrane is installed on a roof; the highly reflective non-asphalt based elastomeric coating layer forming the portion of the top major surface of the prefabricated asphalt-based waterproof roofing membrane that is exposed to the weather when the prefabricated asphalt-based waterproof roofing membrane is installed on a roof; the highly reflective non-asphalt based elastomeric coating layer having a top surface that has an initial solar reflectance of at least 0.65 and a solar reflectance of at least 0.50 after three years;

providing means for keeping oils and other colored components of the top asphalt layer from exuding into the highly reflective non-asphalt based elastomeric coating layer and reducing the reflectance of the highly reflective non-asphalt based elastomeric coating layer; the means being a polymer primer layer, which is impermeable to oils and other colored components of the top asphalt layer, applied to the top major surface of the top asphalt layer so that; the polymer primer layer is interposed between the top asphalt layer and the highly reflective non-asphalt based elastomeric coating layer to keep the oils and other colored components of the top asphalt layer from exuding into the highly reflective non-asphalt based elastomeric coating layer and reducing the reflectance of the highly reflective non-asphalt based elastomeric coating layer; the polymer primer layer being bonded to the top major surface of the top asphalt layer; and the highly reflective non-asphalt based elastomeric coating layer being bonded to the top major surface of the top asphalt layer by being bonded to a top surface of the polymer primer layer;

subsequent to applying the highly reflective non-asphalt based elastomeric coating material only to the first portion of the top major surface of the top asphalt layer of the saturated and coated reinforcing substrate applying a release sheet to at least one of the major surfaces of the prefabricated asphalt-based waterproof roofing membrane so that the prefabricated asphalt-based waterproof roofing membrane can to be wound into a roll for packaging, storage, shipping, and handling and unwound from the roll for installation; and winding the prefabricated asphalt-based waterproof roofing membrane into a roll.

\* \* \* \* \*